United States Patent [19]

Thompson

[11] Patent Number: 4,530,307

[45] Date of Patent: Jul. 23, 1985

[54] TEAT CUP INFLATION

[75] Inventor: Paul D. Thompson, Madison, Wis.

[73] Assignee: DEC International, Inc., Madison, Wis.

[21] Appl. No.: 670,630

[22] Filed: Nov. 13, 1984

Related U.S. Application Data

[63] Continuation of Ser. No. 433,087, Oct. 6, 1982, abandoned.

[51] Int. Cl.³ .............................................. A01J 5/04
[52] U.S. Cl. ................................................. 119/14.49
[58] Field of Search ......................... 119/14.49–14.53, 119/14.47

[56] References Cited

U.S. PATENT DOCUMENTS 2,997,980  8/1981  Noorlander ...................... 119/14.49
4,315,480  2/1982  Noorlander ...................... 119/14.49

Primary Examiner—Jay N. Eskovitz
Attorney, Agent, or Firm—Michael, Best & Friedrich

[57] ABSTRACT

An inflation for mounting in a teat cup assembly in the form of an elongated tubular member made of silicon material and having a uniform cross-section from end to end and a wall thickness of approximately 0.05 inches. The wall of the tubular member consists of a plurality of outwardly projecting flute portions connected by a plurality of inwardly projecting flute portions, said outwardly and inwardly projecting flute portions extending vertically and parallel with each other.

1 Claim, 2 Drawing Figures

TEAT CUP INFLATION

This is a continuation of application Ser. No. 433,087 filed Oct. 6, 1982, now abandoned.

BACKGROUND OF THE INVENTION

I. FIELD OF THE INVENTION

This invention relates to teat cup assemblies used for milking cows and more particularly to an improved inflation for use in such a teat cup assembly.

II. DESCRIPTION OF THE PRIOR ART

The following is a list of prior art patents uncovered in a novelty search directed to the present invention. U.S. Pat. No. 168,234 to Ridd; U.S. Pat. No. 524,738 to Shiels; U.S. Pat. No. 890,376 to Ridd; U.S. Pat. No. 1,000,948 to Ridd; U.S. Pat. No. 1,285,079 to Eklundh et al.; U.S. Pat. No. 1,312,941 to Anderson; U.S. Pat. No. 1,333,261 to Knowles; U.S. Pat. No. 2,997,980 to Noorlander; U.S. Pat. No. 3,659,558 to Noorlander; U.S. Pat. No. 3,967,587 to Noorlander.

Some of the prior art patents disclose inflation designs having a non-circular configuration. Examples are U.S. Pat. Nos. 3,659,558 and 1,285,079. None of the above-listed prior art patents shows an inflation made of silicon material and having a fluted wall configuration.

SUMMARY OF THE INVENTION

An inflation for mounting in a teat cup assembly including an elongated tubular member having a uniform cross-section from end to end with the wall of said inflation consisting of a plurality of outwardly projecting flute portions connected by a plurality of inwardly projecting flute portions. The outwardly and inwardly projecting flute portions extend vertically and parallel with each other.

DESCRIPTION OF THE PREFERRED EMBODIMENT

Figures 1, 2:
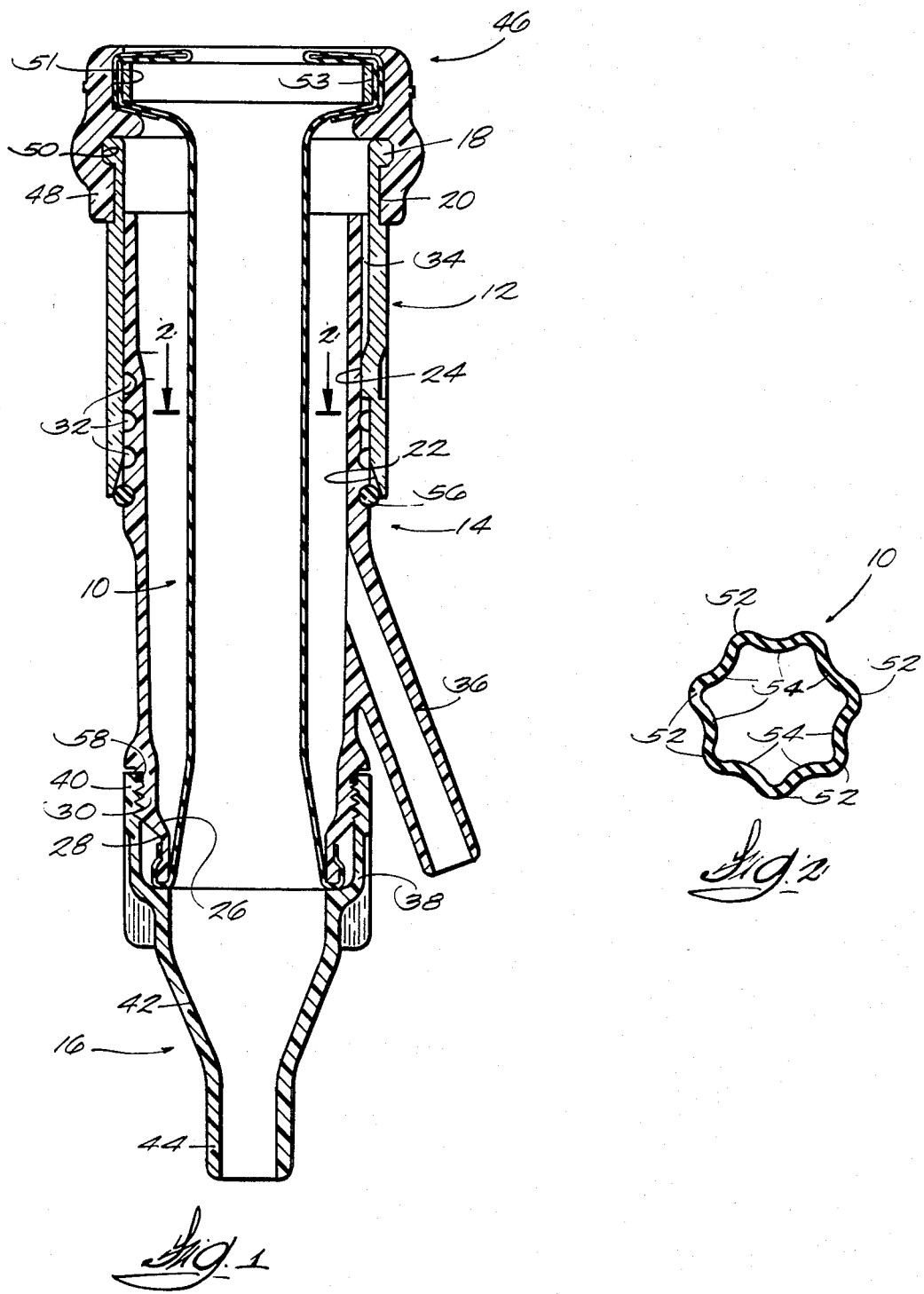
FIG. 1 is a sectional view of a teat cup assembly in which the improved inflation of the present invention is mounted.
FIG. 2 is a fragmentary sectional view taken along line 2—2 of FIG. 1.

Referring to the drawings, the improved inflation of the present invention is designated generally by reference numeral 10. A teat cup assembly of the type in which inflation 10 could be mounted is shown in U.S. Pat. No. 4,269,143. More specifically, inflation 10 is mounted in a teat cup assembly comprised of an upper shell member 12, a central shell member 14 and an end cap member 16.

Upper shell member 12 is of a cylindrical shape and has a lip 18 at the upper end thereof and a retaining groove 20 adjacent the lip 18. The inner surface of member 12 is chamfered at its lower end as indicated by reference numeral 22.

An inwardly extending lug 24 is formed in the wall of member 12 for a purpose to be described hereinafter.

Central shell member 14 is of cylindrical shape and has a lower end portion 26 of reduced diameter which, in turn, has a retaining groove 28 and a threaded portion 30 on the outside surface thereof. Member 14 also has a plurality of axially spaced grooves 32 and a longitudinally extending keyway 34 which extends from the grooves 32 to the upper end of member 14. Member 14 is also provided with a vacuum line connector tube 36 which communicates with the interior of the member 14 and is formed integrally therewith.

Each cap member 16 is comprised of a cylindrical body portion 38 having an internal threaded portion 40 and a funnel-shaped portion 42 having a connector tip 44 for connection to a milk line (not shown).

An inflation retainer member 46 is mounted on the top of member 12. Member 46 (preferably of molded rubber) has a retaining lip 48 which seats in groove 20 of member 12 and a groove 50 in which lip 18 of member 12 is retained. The upper end of inflation 10 is secured in an internal groove 51 in member 46 by a metal retaining ring 53.

Inflation 10, when in its unassembled condition, is essentially in the form of an elongated tubular member having a uniform cross-section from end to end like that shown in FIG. 2. In the preferred embodiment, inflation 10 is made of silicon material and has a cross-section having a fluted configuration like that shown in FIG. 2. More specifically, the wall of the inflation has seven (7) outwardly projecting flute portions 52 formed therein connected by seven (7) inwardly projecting flute portions 54. Outwardly and inwardly extending flute portions 52 and 54 extend vertically, parallel to each other. Flute portions 52 have a steeper slope than flute portions 54 and flute portions 54 are wider than flute portions 52.

In use, parts of the teat cup assembly are assembled by proceeding as follows. Inflation retainer member 46 is mounted on the top of upper shell member 12 as shown in FIG. 1. Inflation 10 is inserted through the retainer member 46 and secured therein by retaining ring 53 which is installed by a special tool (not shown).

Next the previously assembled inflation 10 and shell member 12 is assembled with central shell member 14. This is accomplished by first mounting a ring member 56 between the lowest of grooves 32 and connecting tube 36 in the proper groove 32. The parts are assembled by aligning lug 24 on member 12 with keyway 34 in member 14 and then sliding member 12 over the upper portion of member 14 until chamfered surface 22 at the bottom edge of member 12 seats against ring 56. Next, the lower end of inflation 10 is stretched through the end of member 14 and then folded back over the end of the member with the end of the inflation seated in groove 28. Shell member 12 is then extended upwardly on central shell member 14 until ring 56 can be engaged into one of grooves 32. Ring 56 in groove 32 thus serves as a stop means to limit the extent of the telescopic engagement of shell member 12 on shell member 14. When the inflation 10 is new, ring 56 is positioned in the lowermost groove 32 as shown in FIG. 1.

The final step of assembly is the installation of cap member 16 on the end of shell member 14. This is accomplished by simply screwing the two parts together by means of mating threaded portions 30 and 40 on the shell and cap respectively. As cap member 16 is tightened snugly on shell 14, the internal shoulder on the cap will bear against the folded-over portion of inflation 10 to thereby seal the parts at the joint between the cap 16 and the shell 14. An O-ring member 58 provides a further sealing means between the parts to prevent entrance of contaminants from outside of the asembly into threaded portions 30 and 40.

The fluted wall inflation 10 provides advantages over prior inflations known to applicant. As previously stated, inflation 10 is preferably made of silicon. By the use of silicon material, the wall thickness of the inflation can be reduced without sacrificing durability. The wall thickness is approximately 0.05 inches in the preferred embodiment. The result of a reduced wall thickness as well as of the fluted wall configuration is an inflation having greater radial distensibility. The fluted inflation provides a greater range of expansion and can thus accommodate teats having a relatively large size variation. The improved flexibility of the inflation also provides improved massaging action of the cow's teats, i.e., a more uniform massaging action over substantially the entire surface of the teat can be caused to occur because the resting effective diameter of the inflation can be less than the diameter of the teat inserted into it. It is also noted that upon the collapse cycle of the unit (i.e., when atmospheric pressure is applied to the exterior of the inflation), the tendency of the lower end of the inflation to collapse on itself and shut off vacuum to the teat will be substantially reduced due to the fluted configuration of the inflation. By providing an odd number of flutes (seven in the preferred embodiment), the likelihood of shut-off upon inflation collapse is further reduced.

Although the preferred embodiment calls for the inflation to be of uniform cross-section from end-to-end, it will be apparent that the essential feature of improved radial distensibility could be achieved if either the retainer member 46 or the connector tip 44, or modifications thereof, were molded as part of the inflation, or if the cross section changed in some regular fashion from end-to-end, as, for example, in a generally tapered configuration.

It is claimed:

1. An inflation for mounting in a teat cup assembly for use in a milking unit comprising:
    an elongated member of an elastomeric material including a tubular portion having a wall consisting of a plurality of outwardly projecting flute portions connected by a plurality of inwardly projecting flute portions, said outwardly and inwardly projecting flute portions extending vertically and parallel with each other, the number of said outwardly and inwardly projecting portions being in excess of three, the adjacent external surfaces of said outwardly projecting flute portions extending at an acute angle with each other to define a substantially circular internal cross section wherein said flute portions are in the form of undulations spaced along the circumference of said circular cross section to prevent complete closure of the inflation when atmospheric pressure is applied to the exterior of the inflation.

* * * * *